April 16, 1929.  J. F. PETERS  1,709,629

ARC WELDING SYSTEM

Filed Sept. 10, 1924

WITNESSES:
R. J. Butler.
Lester J. Budlong.

INVENTOR
John F. Peters.
BY
Wesley G. Carr
ATTORNEY

Patented Apr. 16, 1929.

1,709,629

UNITED STATES PATENT OFFICE.

JOHN F. PETERS, OF EDGEWOOD PARK, PENNSYLVANIA, ASSIGNOR TO WESTINGHOUSE ELECTRIC & MANUFACTURING COMPANY, A CORPORATION OF PENNSYLVANIA.

ARC WELDING SYSTEM.

Application filed September 10, 1924. Serial No. 736,848.

My invention relates to electric welding and particularly to a voltage stabilizing reactor therefor.

One object of my invention is to provide an arc-welding circuit that employs a saturatable reactor for the purpose of stabilizing voltage conditions in the circuit.

Another object of my invention is to provide an arc-welding system that shall have a reactor that is saturatable at a voltage slightly in excess of the voltage needed to normally maintain the welding arc.

A further object of my invention is to provide an arc-welding system that shall have means for preventing an excessive rise in voltage in the secondary winding of the power transformer when the welding arc is inactive.

It is well known that, in order to make an arc stable, an impedance must be connected in series. This is generally in the form of reactance or resistance. In the usual construction of arc-welding transformers the stabilizing impedance is obtained by designing the transformer to give a high magnetic leakage. The function of this impedance is as follows: When the voltage force of the arc decreases, the arc current tends to increase. This current, in traversing the impedance, absorbs a part of the supply voltage and this reaction, in turn, decreases the arc current to normal value. Conversely, if the arc current tends to decrease, the voltage across the impedance decreases, making available an increase in voltage for establishing the normal arc current.

In the usual arc-welding transformers, if the arc completely extinguishes, the voltage across the electrodes is fixed by the turns ratio between the primary and secondary windings of the transformer, irrespective of the reactance between primaries and secondaries. This secondary or electrode voltage is obtained because the reactance cannot decrease the voltage, since there is zero current traversing it. In my improved arc welding transformer, I provide a reactor in parallel circuit with the electrode terminals so that, in case the current through the arc becomes zero and the secondary voltage tends to take a voltage corresponding to the transformer turns ratio, the saturated reactor will draw a large current which passes through the reactance between the primary and secondary windings of the transformer. The reactor current, by reason of the ordinary functioning of a reactor, decreases the transformer secondary voltage. By providing a reactor that is permanently connected to the secondary circuit of the transformer, it is possible to stabilize such voltages, as is more fully described hereinafter.

In the accompanying drawings.

Figure 1:
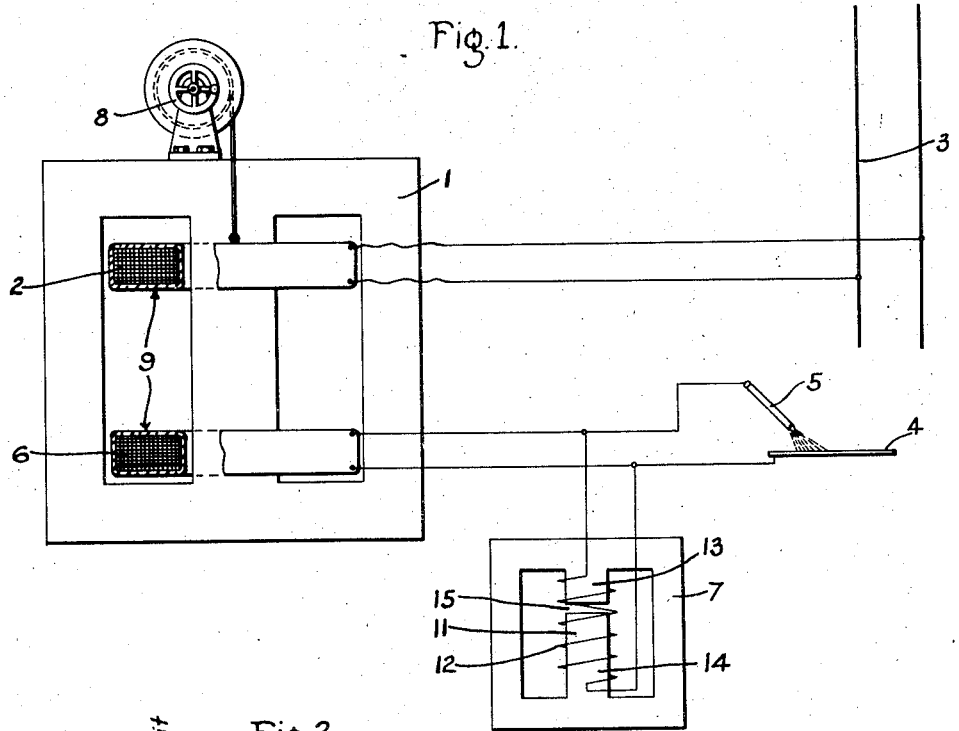
Figure 1 is a diagrammatic view, partially in elevation and partially in section, of a welding circuit embodying my invention.

My invention comprises, in general, a constant-current transformer 1, the primary winding 2 of which is supplied from a power circuit 3, a pair of welding electrodes 4 and 5 that are supplied by current from the secondary winding 6 of the transformer, and a reactor 7 that is connected in parallel circuit between the electrodes 4 and 5 and the secondary winding 6.

The transformer 1 is provided with suitable hoisting means 8 for regulating the length of the air gap 9, between the primary and the secondary windings. The reactor 7 is provided with a central core member 11, about which is disposed a winding 12, comprising sections 13 and 14 that are separated by an air gap 15. The reactor 7 is so designed that it becomes magnetically saturated when the voltage of the secondary winding 6 slightly exceeds the normal voltage required to sustain the welding arc between the electrodes 4 and 5. The winding 12 is of sufficiently heavy-gauge wire to safely carry a current far in excess of the current value at the time the reactor 7 becomes saturated.

Upon the formation of a welding arc between the electrodes 4 and 5, the secondary winding 6 becomes energized by reason of the ratio of its turns to the turns of the primary winding 2. However, the impedance of the transformer 1 to the traversing arc current is such as to reduce the terminal voltage of the secondary winding 6 to the normal operating voltage. While the arc between the electrodes 4 and 5 continues, this system of magnetic forces becomes relatively stable. However, upon the sudden interruption of the welding arc between the electrodes 4 and 5, momentarily no current traverses the secondary winding 6 and the latter becomes increasingly excited by reason of the turns ratio of the primary winding 2 to the secondary winding 6 without the counteracting force of the current against the impedance of the transformer 1, and a tendency exists for the secondary winding 6 to be subjected to voltage surges far in excess of those for which it is normally designed and insulated. This condition exists until a counteracting current traverses the reactor 7, as hereinafter explained. Such voltage surges are liable to puncture the insulation between the individual turns of the winding or to cause flash-overs to occur between electrical conductors connected thereto, although the greatest danger is that of electrically shocking or burning the operator.

When the welding arc is in normal operation, it requires a particular voltage, that may be assumed at approximately 40 volts, that is also the voltage across the terminals of the secondary winding 6. Such voltage is insufficient to saturate the reactor 7 which is designed to become saturated at a voltage in excess of that normally required to sustain a welding arc. A saturating voltage for the reactor 7 may be assumed to be 50 volts. Under such conditions, the reactor 7 and winding 12 offer an impedance to the passage of current that is in excess of the resistance of the welding arc and, accordingly, relatively little current traverses the winding 12.

Figure 2:
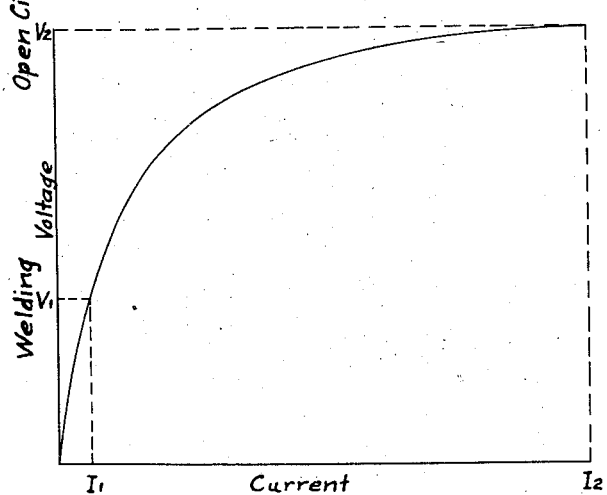
Fig. 2 is a characteristic voltage curve of the system shown in Fig. 1.

Upon the interruption of the welding arc between the electrodes 4 and 5, the voltage at the terminals of the secondary winding 6 increases, as has heretofore been explained, and in accordance with the curve shown in Fig. 2. The increase in voltage applied to the winding 12 causes an increasingly greater amount of current to traverse the same, and the frame of the reactor 7 becomes increasingly energized until it becomes saturated at the predetermined voltage. However, the voltage at the terminals of the secondary winding exceeds the saturating voltage, and a current in excess of the saturating current traverses the winding 12. The passage of this current against the impedance of the saturated reactor 7 causes the voltage of the secondary winding to fall away from a straight line and to assume the curve shown by the co-ordinates $V_2$, $I_2$ in Fig. 2. The change of slope between that part of the curve shown by the co-ordinates $V_1$, $I_1$ and the portion of the curve defined by the co-ordinates $V_1$, $I_1$ and $V_2$, $I_2$ represents the effect of the presence of the saturated reactor in preventing the building up of an excessive voltage in the secondary winding 6.

Upon the striking of an arc between the electrodes 4 and 5, the voltage of the system is again reduced to the normal operating value and the energy stored in the reactor 7 is dissipated in the form of electrical energy furnished to the arm until the reactor again reaches a point of magnetic intensity below its saturation point.

By reason of the presence of the saturated reactor in an arc-welding circuit, I am enabled to stabilize the voltage of that circuit, thereby eliminating the high-voltage surges to which the secondary windings of supply transformers have heretofore been subjected.

I do not wish to be restricted to the specific circuit connections or arrangement of parts herein set forth, as various modifications thereof may be effected without departing from the spirit and scope of my invention. I desire, therefore, that only such limitations shall be imposed as are indicated in the appended claims.

I claim as my invention:

1. The combination with the secondary winding of a transformer and a pair of welding electrodes, of a reactor connected in shunt therewith for stabilizing the voltage of the circuit.

2. The combination with the secondary winding of a transformer and a pair of welding electrodes, of a saturatable reactor connected in shunt therewith for stabilizing the voltage of the circuit.

3. The combination with the secondary winding of a transformer and a pair of terminals for supplying a fluctuating current, of a reactor connected in shunt therewith for stabilizing the voltage of the circuit.

4. The combination with the secondary winding of a transformer and a pair of terminals for supplying a fluctuating current, of a saturatable reactor connected in shunt therewith for stabilizing the voltage of the circuit.

5. The combination with the secondary winding of a transformer and a pair of terminals for supplying a fluctuating current, of a reactor connected in shunt therewith, the reactor becoming saturated at a voltage slightly above that required for normally sustaining an arc between the terminals.

6. The combination with the secondary winding of a transformer and a pair of welding electrodes, of a reactor connected in shunt therewith, the reactor becoming saturated at a voltage slightly above the normal voltage required for sustaining an arc between the welding electrodes.

7. The combination with the secondary winding of a transformer and a pair of welding electrodes, of means connected in parallel circuit with the winding and electrodes whereby the voltage of the circuit is stabilized during the fluctuations of the current traversing the winding by reason of operation of the electrodes.

8. The combination with the secondary winding of a transformer and a pair of welding electrodes, of a reactor connected in parallel circuit with the winding and electrodes whereby the voltage of the circuit is stabilized during the fluctuations of the current traversing the winding by reason of operation of the electrodes.

9. The combination with the secondary winding of a transformer and a pair of welding electrodes, of a saturatable reactor connected in parallel circuit with the winding and electrodes whereby the voltage of the circuit is stabilized during the fluctuations of the current traversing the winding by reason of the operation of the electrodes.

10. The combination with a transformer winding, and welding apparatus operated thereby, of a reactor associated with said transformer winding for preventing excessive rise in voltage thereacross upon decrease in the load imposed thereon by said welding apparatus.

In testimony whereof, I have hereunto subscribed my name this 4th day of September, 1924.

JOHN F. PETERS.